US008948979B2

(12) United States Patent
Malsam

(10) Patent No.: US 8,948,979 B2
(45) Date of Patent: Feb. 3, 2015

(54) VARIABLE-SPEED IRRIGATION SYSTEM

(75) Inventor: Craig S. Malsam, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 148 days.

(21) Appl. No.: 13/549,439

(22) Filed: Jul. 14, 2012

(65) Prior Publication Data

US 2013/0018553 A1 Jan. 17, 2013

Related U.S. Application Data

(60) Provisional application No. 61/507,693, filed on Jul. 14, 2011.

(51) Int. Cl.
*G06F 7/70* (2006.01)
*G06F 17/00* (2006.01)

(52) U.S. Cl.
USPC .................. 701/50; 701/52; 701/58; 701/65

(58) Field of Classification Search
USPC ............................................... 701/50, 51, 52
See application file for complete search history.

(56) References Cited

U.S. PATENT DOCUMENTS

| 4,034,778 | A | | 7/1977 | Sage | |
|---|---|---|---|---|---|
| 6,007,004 | A | * | 12/1999 | Unruh | 239/729 |
| 6,045,065 | A | | 4/2000 | Gerdes | |
| 6,755,362 | B2 | * | 6/2004 | Krieger et al. | 239/731 |
| 6,820,828 | B1 | * | 11/2004 | Greenwalt | 239/726 |
| 7,584,053 | B2 | * | 9/2009 | Abts | 701/485 |
| 2002/0008167 | A1 | * | 1/2002 | Haberland et al. | 239/722 |
| 2003/0066912 | A1 | * | 4/2003 | Krieger et al. | 239/731 |
| 2004/0093912 | A1 | * | 5/2004 | Krieger et al. | 68/12.26 |
| 2006/0027677 | A1 | * | 2/2006 | Abts | 239/67 |
| 2007/0267524 | A1 | * | 11/2007 | Mack | 239/729 |
| 2010/0141194 | A1 | | 6/2010 | Koehl | |

* cited by examiner

*Primary Examiner* — Ian Jen
(74) *Attorney, Agent, or Firm* — David H. Milligan

(57) ABSTRACT

An irrigation system is disclosed that is configured to maintain a near straight alignment. In an implementation, an irrigation system includes multiple interconnected spans which are supported by multiple tower structures. Each tower structure includes a variable-speed drive unit for selectively driving a tower structure at a selected speed. The irrigation system also includes multiple sensors that are each associated with a corresponding span to determine an alignment of the corresponding span with respect to adjacent spans. Each of the sensors is in communication with a corresponding variable-drive control unit. Each of the variable-drive control units are configured to control the selected speed of a corresponding variable-speed drive unit to maintain the interconnected spans in a substantially linear orientation with respect to adjacent ones of the plurality of interconnected spans along a generally longitudinally oriented axis (e.g., maintain alignment of the spans with respect to each other).

17 Claims, 4 Drawing Sheets

VARIABLE-SPEED IRRIGATION SYSTEM

CROSS-REFERENCE TO RELATED APPLICATIONS

The present application claims the benefit under 35 U.S.C. §119(e) of U.S. Provisional Application Ser. No. 61/507,693, entitled VARIABLE SPEED MECHANIZED IRRIGATION SYSTEM, filed on Jul. 14, 2011. U.S. Provisional Application Ser. No. 61/507,693 is herein incorporated by reference in its entirety.

BACKGROUND

Modern day agriculture has become increasingly efficient in the past century and this trend must continue in order to produce a sufficient food supply for the increasing world population. A notable advancement in agricultural production was the introduction of mechanized irrigation systems, such as the center pivot and the linear move irrigation systems. These irrigation systems make it possible to irrigate entire fields, and reduce a crop yield's vulnerability to extreme weather conditions. The ability to monitor and to control the amount of water and/or nutrients (applicants) applied to an agricultural field has increased the amount of farmable acres in the world and increases the likelihood of a profitable crop yield. These irrigation systems typically include a control device configured to furnish a user interface allowing the operator to monitor and control one or more functions or operations of the irrigation system.

SUMMARY

An irrigation system is disclosed that is configured to maintain a near straight (e.g., an at least zero degree (0°)) alignment. In an implementation, an irrigation system includes multiple interconnected spans which are supported by multiple tower structures. Each tower structure includes a variable-speed drive unit for selectively driving a tower structure at a selected speed. In a specific implementation, the variable-speed drive units may be switched reluctance motors. The irrigation system also includes multiple sensors that are each associated with a corresponding span to determine an alignment of the corresponding span with respect to adjacent spans. Each of the sensors is in communication with a corresponding variable-drive control unit. Each of the variable-drive control units are configured to control the selected speed of a corresponding variable-speed drive unit to maintain the interconnected spans in a substantially linear orientation with respect to adjacent ones of the plurality of interconnected spans along a generally longitudinally oriented axis (e.g., maintain alignment of the spans with respect to each other). In a specific implementation, the variable-drive control units may be in direct communication with the corresponding sensor.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Most irrigation systems, such as center pivot irrigation systems, include drive units (motors) located on the drive towers to propel the irrigation system. Many of these rely on fixed rate motors due to their relative simplicity and robustness. However, such systems can only adjust the relative alignment of various span portions by alternatively starting and stopping the drives. This results in drive towers coming to a complete stop and then requiring a large impulse of power to start the tower again. The starting and stopping places undue stress on various components of the irrigation system, which can accelerate wear and increase maintenance costs. The irregular motion can also cause uneven application of irrigation water and/or chemicals to the field. This results in waste of both water and chemicals. The irregular motion can also cause errors in alignment or in determining the position of the end of the machine. This can result in errors in operations based on position.

Accordingly, an irrigation system is disclosed that is configured to maintain a near straight (e.g., an at least zero degree (0°)) alignment. In an implementation, an irrigation system includes multiple interconnected spans which are supported by multiple tower structures. Each tower structure includes a variable-speed drive unit for selectively driving a tower structure at a selected speed. The irrigation system also includes multiple sensors that are each associated with a corresponding span to determine an alignment of the corresponding span with respect to adjacent spans. Each of the sensors is in communication with a corresponding variable-drive control unit. Each of the variable-drive control units are configured to control the selected speed of a corresponding variable-speed drive unit to maintain the interconnected spans in a substantially linear orientation with respect to adjacent ones of the plurality of interconnected spans along a generally longitudinally oriented axis (e.g., maintain alignment of the spans with respect to each other).

Example Implementations

Figure 1A:
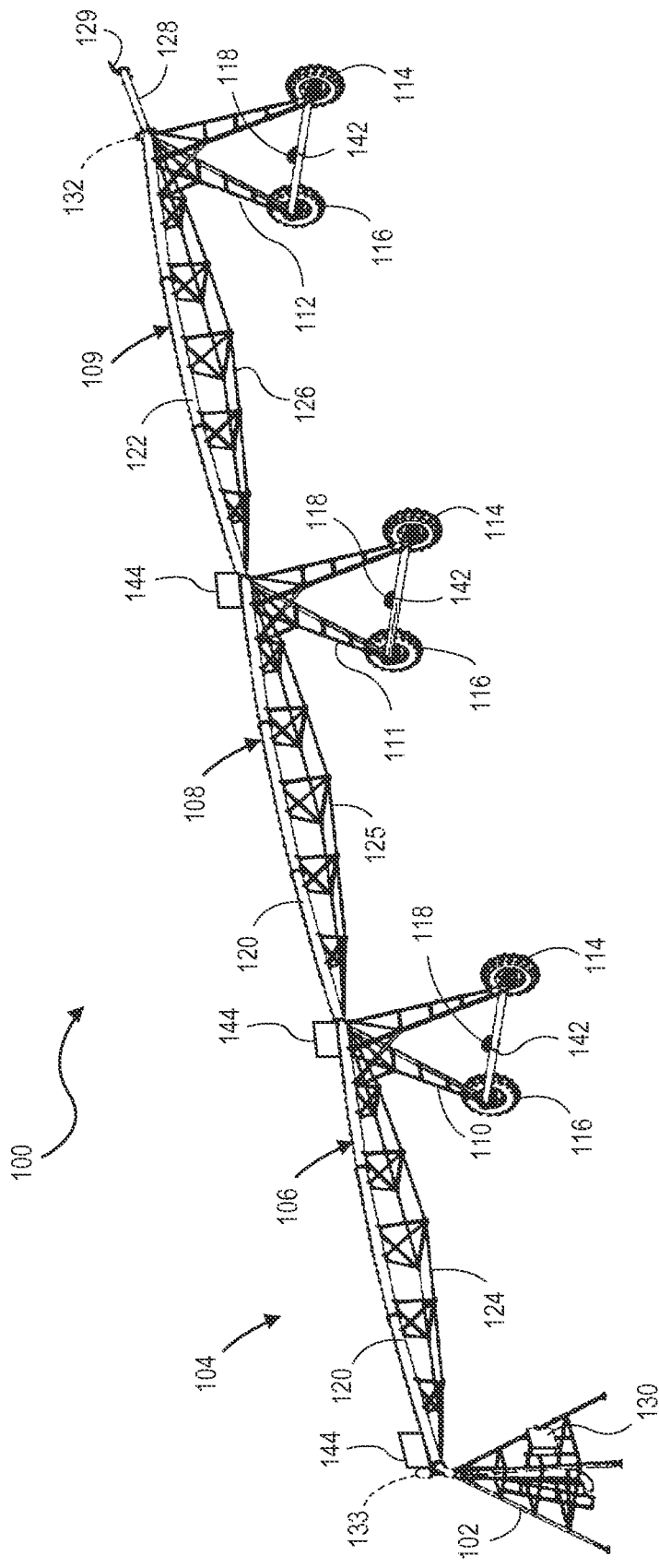
FIG. 1A is an isometric diagrammatic perspective view of an irrigation system in accordance with an example implementation of the present disclosure.

FIG. 1A illustrates a self-propelled (e.g., mechanized) irrigation system (assembly) 100 in accordance with example implementations of the present disclosure. Examples of self-propelled irrigation systems include a center pivot irrigation system, a linear move irrigation system, or the like. FIG. 1A illustrates an embodiment of the present disclosure where the irrigation system 100 is a center pivot irrigation system. However, it is contemplated that the present disclosure may be implemented in other self-propelled irrigation systems (e.g., linear move irrigation systems). As shown, the system 100 includes a center pivot structure 102, a main section assembly 104 (irrigation section assembly) coupled (e.g., connected) to the center pivot structure 102. The center pivot structure 102 has access to a well, a water repository (e.g., water tank), or other fluid source, to furnish water to the irrigation system 100. For instance, the well may be located under the center pivot structure 102. In another instance, the well may be in close proximity to the cultivation area (e.g., field). The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like. The irrigation system 100 may be coupled to a fluid displacement device (e.g., a pump assembly) configured to furnish applicant throughout the irrigation system 100. For example, the fluid displacement device may assist in displacing fluid from the fluid source (e.g., well, water repository, etc.) to the conduit portions of the irrigation system which are described herein. The center pivot structure 102 can be fixed or can be towable such that an operator can move the irrigation system 100 from one field to another. In an implementation, the center pivot structure 102 may comprise a frame assembly (e.g., galvanized steel frame assembly, and so forth).

The main section assembly 104 includes a number of interconnected spans 106, 108, 109 (e.g., irrigation spans) supported by one or more tower structures 110, 111 (intermediate tower structures) and an end tower structure 112. The tower structures 110, 111, 112 may be any tower configuration known in the art to adequately support the conduits (e.g., water pipe sections) described herein. It is understood that the section assembly 104 may include any number of spans and tower structures.

The tower structures 110, 111 and the end tower structure 112 each include wheels 114, 116, to assist in traversing the irrigation system 100 (e.g., allowing the main section assembly 104 to pivot) about a cultivation area (e.g., field). In an implementation, the wheels 114, 116 may be driven by a suitable variable-drive unit 118 (e.g., drive motor), or the like, to assist in traversing the system 100 about the specified area. For example, each tower structure 110 may include a drive unit 118 to propel the respective tower structure 110, 111, 112 (and the irrigation system 100) through the cultivation area. In one or more implementations, the drive units 118 comprise variable-speed motors that are configured to selectively drive a tower structure at a selected speed. For example, the drive units 118 may comprise electric switched reluctance motors configured to drive the irrigation system 100 in a forward direction or a reverse direction. Typically, the alignment between each span 106, 108, 109 (e.g., machine alignment) of the irrigation system 100 is maintained by a suitable mechanical linkage at each drive unit span joint. The drive unit span joint is configured as a potentiometer, or other sensor, that serves to accelerate or decelerate the respective drive unit 118 (switched reluctance motors, which are described in greater detail below) to at least substantially keep the respective span 106, 108, 109 in alignment with the other irrigation span. Alignment may be defined as each span 106, 108, 109 being aligned with one or more adjacent spans along a generally linear longitudinal axis (e.g., defined with respect to a generally horizontal surface, such as the ground).

As shown in FIG. 1A, each span 106, 108 includes conduits 120, 121, 122 (e.g., pipes) that are configured to carry (e.g., transport, provide, and so forth) liquid (e.g., applicant) along the length of the system 100 to one or more applicant dispersal assemblies that are configured to irrigate the cultivation area. Each conduit 120, 121, 122 may be coupled to one another to allow fluid communication between each conduit. In an implementation, the conduits 120, 121, 122 may be supported by truss-type framework structures 124, 125, 126. Thus, the main fluid displacement device may be configured to displace applicant through the conduits 120, 121, 122. As shown in FIG. 1A, the irrigation system 100 also includes a cantilevered boom structure 128 that extends outwardly from the end tower structure 112. In one or more implementations, the cantilevered boom 128 includes an end gun 129 (e.g., end gun 129 is mounted to the cantilevered boom 128). The end gun 129 may be a suitable pressure sprayer configured to be activated at the corners of a field, or other designated areas, to increase the amount of land that can be irrigated.

Figure 1B:
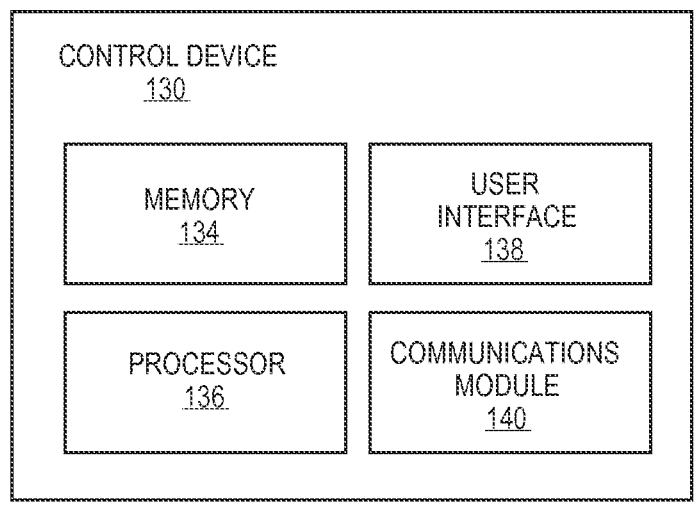
FIG. 1B is a block diagram illustrating a control device of the irrigation system shown in FIG. 1A in accordance with an example implementation of the present disclosure.

As shown in FIGS. 1A and 1B, the irrigation system 100 includes a control device 130 (e.g., control panel) that is in electronic communication with one or more components of the system 100. For example, the control device 130 may be in electronic communication with one or more tower boxes mounted at one or more tower structures 110, 111, 112, and a position sensor 132 utilized to determine an approximate position of the irrigation system (e.g., determining the approximate position of the end tower structure 112 within the cultivation area with respect to the center pivot structure 102). In an implementation, the position sensor 132 may be a GPS sensor (e.g., GPS receiver), or the like, mounted to the end tower structure 112 configured to transmit signals representing the position of the end tower structure to the control device 130. As described herein, the control device 130 is configured to determine the radial position of the main section assembly 104 with respect to the center pivot structure 102. In another implementation, the position sensor 132 may be an angle sensor 133 configured to facilitate determination of the rotational position of the main section assembly 104. The angle sensor 133 may be mounted to the center pivot structure 102 to assist in determining the rotational position of the main section assembly 104.

In an implementation, the control device 130 is mounted to the central pivot structure 102, a control cart, or a tower structure 110, 111, 112. The control device 130 is generally located on the structural element of the irrigation system 100 where the applicant/water is introduced into the irrigation system; however, other configurations known in the art are within the scope of the present disclosure.

The control device 130 is configured to monitor operating conditions and configured to control various functions of the irrigation system 100. In certain implementations, the control device 130 actively monitors the irrigation system's 100 function and performance including, but not limited to: a position of one or more conduit sections 120, 121, 122 or tower structures 110, 111, 112 (e.g., the position of the main section assembly 104), whether the irrigation system 100 is powered on or off, a voltage parameter associated with the irrigation system 100, a motor speed parameter associated with the irrigation system 100, an approximate ground speed parameter associated with the irrigation system 100, a direction parameter associated with the irrigation system 100, a diagnostic parameter associated with the irrigation system 100, whether the applicant is being supplied to the irrigation system 100 (e.g., whether the fluid displacement device is operational), whether the Stop in Slot (SIS) is powered on or off, an applicant pressure associated with the irrigation system 100, a time parameter, a date parameter, a field position parameter of the irrigation system components, end-gun status, and whether the programs (e.g., software programs, etc.) are running properly. The control device 130 also controls the irrigation system's 100 functions and settings including, but not limited to: start and stop, selectively powering the main fluid displacement device, an applicant application depth parameter, the direction of travel associated with the irrigation system 100, selectively powering the SIS, automatically reversing or stopping the irrigation system 100, automatically restarting the irrigation system 100, providing an operator auxiliary control to the system 100, writing and editing irrigation programs (e.g., irrigation software programs), and controlling sector and sequential programs (e.g., software programs). In another implementation, the control device 130 may cause an alert to be issued to the operator if there are any errors in the operation of the irrigation system 100 or if any of the functions or conditions monitored by the control device 130 have been compromised (e.g., ceased operation or are outside an acceptable range).

The control device 130 may be housed in a weather-proof box and, as shown in FIG. 1B, includes at least a memory 134 to store one or more software programs (e.g., software modules), a processor 136 communicatively coupled to the memory 134, a user interface 138 (e.g., graphical user interface, etc.), and a communications module 140 (e.g., transmitter, receiver, transceiver, etc.). The memory 134 is an example of tangible computer-readable media that provides storage functionality to store various data associated with the operation of the control device 130, such as software programs/modules and code segments mentioned herein, or other data to instruct the processor 136 to perform the steps described herein.

Figure 1C:
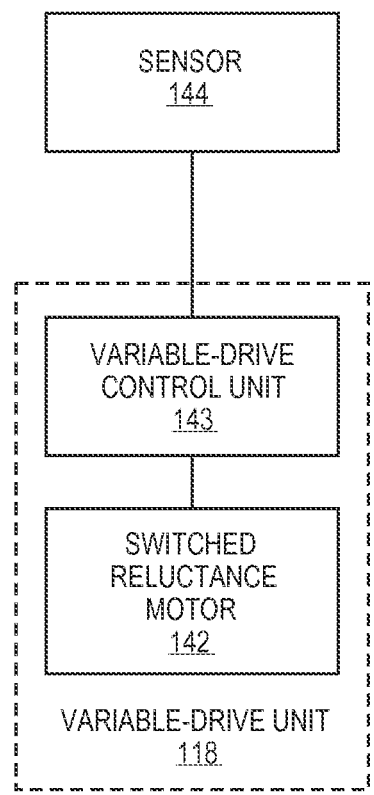
FIG. 1C is a block diagram illustrating a sensor in electronic communication with a variable-drive control unit, wherein the variable control device is configured to control the selected speed of a variable-drive unit based upon an alignment of corresponding adjacent spans as determined by the sensor.

As described above, the irrigation system may include a plurality of drive units 118 mounted to each tower structure 110, 111, 112. As shown in FIG. 1C, each drive unit 118 may comprise a switched reluctance motor (SRM) 142. The switched reluctance motor 142 is an electric motor configured to operate utilizing reluctance torque. The use of switched reluctance motors 142 allows for continuous speed adjustment (as compared to motors not utilizing switched reluctance configurations), which allows for dynamic ("on-the-fly") alignment adjustments of the spans 106, 108, 109. Additionally, the switched reluctance motors 142 allow for the constant movement of the center pivot irrigation systems (as compared to center pivot irrigation systems not having switched reluctance motors), which may allow for greater uniform application of water and/or chemicals while lessening waste.

Figure 1D:
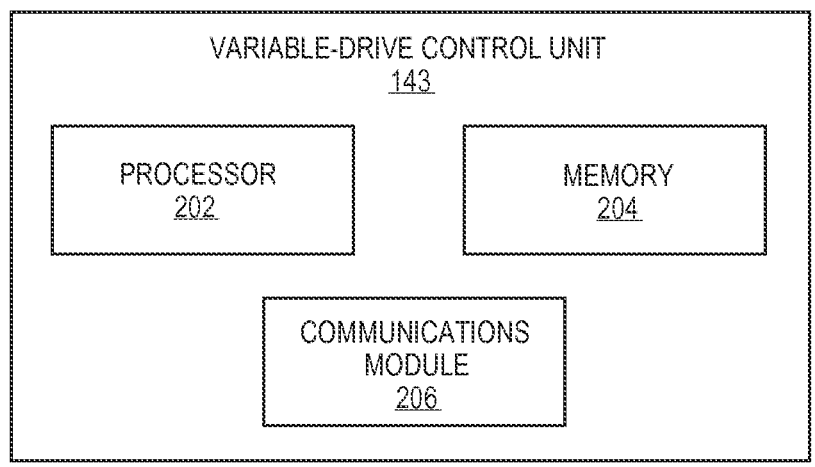
FIG. 1D is a block diagram illustrating an example implementation of a variable-drive control unit that is configured to control a variable-drive unit, wherein the variable-drive control unit includes a processor, a memory, and a communication module configured to communicate with a sensor and the variable-drive unit.

As shown in FIG. 1C, the variable-drive units 118 may each include a variable-drive control unit 143. As shown in FIG. 1D, the variable-drive control unit 143 includes a processor 202 is configured to provide processing functionality to the variable-drive control unit 143. Thus, the processor 202 may execute one or more software programs and/or instructions described herein. The variable-drive control unit 143 also includes a memory 204, which is an example of tangible computer-readable media that provides storage functionality to store various data associated with the operation of the variable-drive control unit 143, such as software programs/modules and code segments mentioned herein, or other data to instruct the processor 202 to perform the steps described herein. In an implementation, the variable-drive control unit 143 is directly connected with the respective sensor 144 (e.g., via a wired connection). In this implementation, the variable control unit 143 is also directly connected to the respective switched reluctance motor 142 (e.g., via a wired connection). In another implementation, the variable-drive control unit 143 may include a communication module 206, which is configured to communicate with other components (e.g., switched reluctance motors 142, sensors 144) over a communication network (e.g., a wireless network, a wired network, etc.). For example, the communication module 206 may be directed coupled (e.g., via one or more wires, or the like) to a corresponding variable-drive unit 118, as well as a corresponding sensor 144. The communication module 206 may be representative of a variety of communication components and functionality, including, but not limited to: one or more antennas, a transmitter and/or receiver, a transceiver, or the like. While FIG. 1D illustrates that the variable-drive control unit 143 is integrated (e.g., housed within) with the variable-drive unit 118, it is understood that the variable-drive control unit 143 may be a standalone unit.

As shown in FIG. 1C, each of the sensors 144 is in communication with the respective variable-drive control unit 143. In a specific implementation, the sensors are in direct electronic communication with the corresponding variable-drive control unit 143. Previously, irrigation systems may have employed rod-and-switch actuators. These actuators may be replaced with the sensors 144 configured to monitor (e.g., determine) the span-to-span alignment of the irrigation system 100. For example, the sensors 144 are configured to determine an angle between the corresponding spans. In one or more implementations, the sensors 144 may be potentiometers, captive alignment sensors, laser based alignment sensors, non-contact proximity sensors, or other devices capable of quantifiably measuring the span alignment (e.g., determining an angle value between the corresponding spans) rather than merely determining if the respective span 106, 108, 109 is out of alignment beyond a preset maximum value. As described above, the sensors 144 (potentiometers, the captive alignment sensors, the laser based alignment sensors, and/or the non-contact proximity sensors) are in electronic communication with the variable-drive control unit 143. In response, the variable-drive control unit 143 is configured to furnish (e.g., provide, generate, transmit) one or more drive unit signals to control the switched reluctance motor 142. For example, the processor 202 of the variable-drive control unit 143 is configured to translate the angle information furnished by the sensor 144 into speed information that is utilized to control the switched reluctance motor 142 (e.g., control the speed of the corresponding span 106, 108, 109). Thus, the variable-drive control unit 143 may furnish one or more drive unit signals that are configured to cause a specified drive unit 118 to modify the speed (e.g., increase the speed, decrease the speed) of the unit 118 (e.g., switched reluctance motor 142), which causes the corresponding span 106, 108, 109 to vary in speed. In an implementation, the control device 130 may be configured to communicate with each variable-drive control unit during operation of the irrigation system 100. For example, the variable-drive control unit 143 may be configured to furnish diagnostic and/or performance information regarding the variable-drive unit 118 to the control device 130.

In an implementation, a sensor 144 is configured to continually monitor (determine) the alignment values (e.g., angles) of the corresponding spans 106, 108, 109. In turn, the variable-drive control unit 143 is configured to furnish a drive unit signal configured to cause the corresponding drive unit 118 to continuously modify the speed of the drive unit 118 (e.g., modify the speed of the switched reluctance motor 142) to re-align the corresponding mis-aligned span 106, 108, 109.

Thus, the variable-drive control unit 143 is configured to continuously provide signals, based upon the sensor 144 signal, to cause at least substantially near-perfect (e.g., near-horizontal alignment) between the corresponding spans by way of the switched-reluctance motors 142. For example, the speed of the drive unit 118 may be varied (via one or more drive unit signals) based upon a deviation from a zero degree (0° span to span alignment). In one or more implementations, the irrigation system 100 (e.g., sensors 144, variable-drive control unit 143, etc.) may utilize one or more motor control techniques to adjust the speed of the drive units 118 and/or measure the alignment of a particular span. For example, the irrigation system 100 may utilize a proportional-integral-derivative control algorithm, or the like, to fine tune the speed of a particular drive unit 118. The variable-drive control unit 143 is configured to continuously furnish one or more drive unit signals to the drive units 118 when the sensor 144 determines that a particular span is mis-aligned.

Thus, in operation, drive unit (control) signals configured to adjust the set speed of a particular drive unit 118 are furnished to the particular drive unit 118, which causes a drive unit speed adjustment. As described above, the drive unit signals may be based on potentiometer signals, captive alignment sensor signals, laser based alignment sensor signals, non-contact proximity sensor signals, and/or other parameters useful in determining a new set speed for a particular drive unit. As described above, the variable-drive control unit 143 includes a processor 202 that is configured to receive and to utilize data (information) from the tower structures 110, 111, 112 in determining the set speed for a particular drive unit 118. In an implementation, the processor 202 may comprise a microcontroller that includes dedicated logic (e.g., circuitry) for controlling the variable-drive units 118 and/or the switched reluctance motors 142. For example, the variable-drive control unit 143 may be in communication with each of the tower structures 110, 111, 112 by way of sensors 144, or the like. As described above, this may allow for finer speed control and dynamic alignment correction of the irrigation system 100.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An irrigation system comprising:
   a plurality of interconnected spans;
   a plurality of tower structures for supporting the interconnected spans, each one of the plurality of tower structures including a variable-speed drive unit for selectively driving a tower structure at a selected speed;
   a plurality of sensors, each one of the plurality of sensors associated with a corresponding one of the plurality of interconnected spans and configured to determine an alignment of a corresponding one of the plurality of interconnected spans; and
   a plurality of variable-drive control units, each variable-drive control unit of the plurality of drive control units in communication with a corresponding variable-speed drive unit and a corresponding sensor, each variable-drive control unit configured to control the selected speed of the corresponding variable-speed drive unit to maintain the plurality of interconnected spans in a substantially linear orientation with respect to adjacent ones of the plurality of interconnected spans along a generally longitudinally oriented axis,
   wherein the selected speed of the corresponding variable-drive control unit is based upon the alignment.

2. The irrigation system as recited in claim 1, wherein at least one sensor is configured to determine an angle between a first corresponding interconnected span of the plurality of interconnected spans and a second corresponding interconnected span of the plurality of interconnected spans; wherein the corresponding variable-drive control unit is configured to determine a selected speed to maintain the plurality of interconnected spans in a substantially linear orientation with respect to adjacent ones of the plurality of interconnected spans along a generally longitudinally oriented axis, the selected speed based upon the angle.

3. The irrigation system as recited in claim 1, wherein each sensor of the plurality of sensors is in direct communication with a corresponding variable-drive control unit of the plurality of variable-drive control units.

4. The irrigation system as recited in claim 1, wherein the variable-speed drive units comprise switched reluctance motors.

5. The irrigation system as recited in claim 1, wherein the plurality of sensors comprise at least one of a potentiometer, a captive alignment sensor, a laser based alignment sensor, or a non-contact proximity sensor.

6. The irrigation system as recited in claim 1, wherein at least one sensor of the plurality of sensors is configured to continuously furnish a signal to the corresponding variable-drive control unit, wherein the variable-drive control unit is configured to continuously furnish a signal to a variable-drive unit of the corresponding interconnected span to continuously modify a speed of the corresponding tower structure to re-align the corresponding tower structure with the adjacent tower structure.

7. An irrigation system comprising:
   a center pivot structure;
   a main section assembly coupled to the center pivot structure, the main section assembly including a plurality of interconnected spans;
   a plurality of tower structures for supporting the interconnected spans, each one of the plurality of tower structures including a variable-speed drive unit for selectively driving a tower structure at a selected speed;
   a plurality of sensors, each one of the plurality of sensors associated with a corresponding one of the plurality of interconnected spans and configured to determine an alignment of a corresponding one of the plurality of interconnected spans;
   a plurality of variable-drive control units, each variable-drive control unit of the plurality of drive control units in communication with a corresponding variable-speed drive unit and a corresponding sensor, each variable-drive control unit configured to control the selected speed of the corresponding variable-speed drive unit to maintain the plurality of interconnected spans in a substantially linear orientation with respect to adjacent ones of the plurality of interconnected spans along a generally longitudinally oriented axis,
   wherein the selected speed of the corresponding variable-drive control unit is based upon the alignment.

8. The irrigation system as recited in claim 7, wherein at least one sensor is configured to determine an angle between a first corresponding interconnected span of the plurality of interconnected spans and a second corresponding interconnected span of the plurality of interconnected spans; wherein the corresponding variable-drive control unit is configured to determine a selected speed to maintain the plurality of interconnected spans in a substantially linear orientation with respect to adjacent ones of the plurality of interconnected spans along a generally longitudinally oriented axis, the selected speed based upon the angle.

9. The irrigation system as recited in claim 7, wherein each sensor of the plurality of sensors is in direct communication with a corresponding variable-drive control unit of the plurality of variable-drive control units.

10. The irrigation system as recited in claim 7, wherein the variable-speed drive units comprise switched reluctance motors.

11. The irrigation system as recited in claim 7, wherein the plurality of sensors comprise at least one of a potentiometer, a captive alignment sensor, a laser based alignment sensor, or a non-contact proximity sensor.

12. The irrigation system as recited in claim 7, wherein at least one sensor of the plurality of sensors is configured to continuously furnish a signal to the corresponding variable-drive control unit, wherein the variable-drive control unit is configured to continuously furnish a signal to a variable-drive unit of the corresponding interconnected span to continuously modify a speed of the corresponding tower structure to re-align the corresponding tower structure with the adjacent tower structure.

13. An irrigation system comprising:
a center pivot structure;
a main section assembly coupled to the center pivot structure, the main section assembly including a plurality of interconnected spans;
a plurality of tower structures for supporting the interconnected spans, each one of the plurality of tower structures including a switched reluctance motor for selectively driving a tower structure at a selected speed;
a plurality of sensors, each one of the plurality of sensors associated with a corresponding one of the plurality of interconnected spans and configured to determine an alignment of a corresponding one of the plurality of interconnected spans;
a plurality of variable-drive control units, each variable-drive control unit of the plurality of drive control units in communication with a corresponding variable-speed drive unit and a corresponding sensor, each variable-drive control unit configured to control the selected speed of the corresponding switched reluctance motor to maintain the plurality of interconnected spans in a substantially linear orientation with respect to adjacent ones of the plurality of interconnected spans along a generally longitudinally oriented axis,
wherein the selected speed of the corresponding variable-drive control unit is based upon the alignment.

14. The irrigation system as recited in claim 13, wherein at least one sensor is configured to determine an angle between a first corresponding interconnected span of the plurality of interconnected spans and a second corresponding interconnected span of the plurality of interconnected spans; wherein the corresponding variable-drive control unit is configured to determine a selected speed to maintain the plurality of interconnected spans in a substantially linear orientation with respect to adjacent ones of the plurality of interconnected spans along a generally longitudinally oriented axis, the selected speed based upon the angle.

15. The irrigation system as recited in claim 13, wherein each sensor of the plurality of sensors is in direct communication with a corresponding variable-drive control unit of the plurality of variable-drive control units.

16. The irrigation system as recited in claim 13, wherein the plurality of sensors comprise at least one of a potentiometer, a captive alignment sensor, a laser based alignment sensor, or a non-contact proximity sensor.

17. The irrigation system as recited in claim 15, wherein at least one sensor of the plurality of sensors is configured to continuously furnish a signal to the corresponding variable-drive control unit, wherein the variable-drive control unit is configured to continuously furnish a signal to a variable-drive unit of the corresponding interconnected span to continuously modify a speed of the corresponding tower structure to re-align the corresponding tower structure with the adjacent tower structure.

* * * * *